United States Patent
Chae

(10) Patent No.: US 7,486,778 B2
(45) Date of Patent: Feb. 3, 2009

(54) METHOD FOR AUTOMATICALLY TRACING INTERFACE FOR EXCHANGE AND ACCESS NETWORK

(75) Inventor: Il-Seuk Chae, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1075 days.

(21) Appl. No.: 10/774,592

(22) Filed: Feb. 10, 2004

(65) Prior Publication Data

US 2004/0161077 A1 Aug. 19, 2004

(30) Foreign Application Priority Data

Feb. 17, 2003 (KR) .................. 10-2003-0009913

(51) Int. Cl.
*H04M 1/24* (2006.01)
*H04M 3/08* (2006.01)
*H04M 3/22* (2006.01)

(52) U.S. Cl. .............. 379/32.05; 379/32.01; 379/26.01; 379/27.04

(58) Field of Classification Search ................ 379/1.01, 379/9.02, 9.04, 10.01, 15.01, 26.01, 27.01, 379/27.04, 29.01, 29.08, 29.1, 32.01–33

See application file for complete search history.

(56) References Cited

U.S. PATENT DOCUMENTS

| | | | |
|---|---|---|---|
| 5,978,669 A | 11/1999 | Sanmugam | |
| 6,119,000 A | 9/2000 | Stephenson et al. | |
| 6,459,893 B2 | 10/2002 | Pentikäinen | |
| 6,738,455 B1 * | 5/2004 | Miyagawa | 379/27.01 |
| 2001/0013106 A1 * | 8/2001 | Asano | 714/43 |
| 2001/0034204 A1 | 10/2001 | Pentikainen | |

FOREIGN PATENT DOCUMENTS

| | | |
|---|---|---|
| WO | WO 99/31896 | 6/1999 |
| WO | WO 99/65261 | 12/1999 |
| WO | WO 02/31730 | 4/2002 |

OTHER PUBLICATIONS

Chinese Office action for Chinese Patent Application No. 200410005073.6 issued on Aug. 25, 2006.

* cited by examiner

*Primary Examiner*—Quoc D Tran
(74) *Attorney, Agent, or Firm*—Robert E. Bushnell, Esq.

(57) ABSTRACT

A method for automatically tracing an interface for an exchange and a subscriber network, includes setting an operator, reference, a procedure for notifying an event are defined, so that a user could perform interface tracing for an exchange and a subscriber network using a network management system such as EMS.

The method for automatically tracing a subscriber applied to a communication system, includes: receiving setting particulars from an operator in order to perform tracing of a subscriber with respect to an interface for LE (Local Exchange) and a subscriber network (AN: Access network); checking setting particulars of the operator by receiving trace request for the interface from the operator, performing tracing relevant to the setting particulars, providing tracing results to the operator; and providing information for an event so that the operator could check the information upon occurrence of a trace event at an interface relevant to the setting particulars of the operator. Therefore, all the systems having, in their inside, an interface protocol for an exchange and a subscriber network, such as a V5.2 protocol, could perform cause tracking upon generation of problems in a more easy and convenient manner when problems are generated upon matching due to characteristics of each AN or an LE and a system vendor.

20 Claims, 11 Drawing Sheets

FIG. 2A

"01-S01:V5ID = 100,PSTN = ON,CTRL = OFF,BCC = OFF,LINKC = OFF,PROT = OFF, HEX = ON

V5ID = 100, PORTID = 3001

V5ID = 100, PORTID = 2005 ← SUBSCRIBER REGISTERED IN V5ID=100. TEN SUBSCRIBERS ARE ACCOMMODATED AT THE MAXIMUM

...

V5ID = 100, PORTID = 0008

FIG. 2B

"01-S01:V5ID = 100,PSTN = ON,CTRL = ON,BCC = OFF,LINKC = OFF,PROT = OFF, HEX = ON

"01-S02:V5ID = 160,PSTN = OFF,CTRL = ON,BCC = OFF,LINKC = ON,PROT = OFF, HEX = ON

"01-S03:V5ID = 200,PSTN = OFF,CTRL = OFF,BCC = OFF,LINKC = ON,PROT = OFF, HEX = OFF

... ⟵ DISPLAYING FOR ALL THE REGISTERED V5 INTERFACE ID

V5ID = 10, PORTID = 3001

V5ID = 10, PORTID = 2005

V5ID = 160, PORTID = 3002 ⟵ DISPLAYING ALL THE REGISTERED SUBSCRIBERS. UP TO TEN SUBSCRIBERS AT THE MAXIMUM

...

V5ID = 100, PORTID = 0008

US 7,486,778 B2

METHOD FOR AUTOMATICALLY TRACING INTERFACE FOR EXCHANGE AND ACCESS NETWORK

CLAIM OF PRIORITY

This application makes reference to, incorporates the same herein, and claims all benefits accruing under 35 U.S.C. §119 from an application entitled "METHOD FOR AUTOMATICALLY ANALYZING INTERFACE BETWEEN EXCHANGE AND ACCESS NETWORK," earlier filed in the Korean Intellectual Property Office on 17 Feb. 2003 and thereby duly assigned Serial No. 2003-9913.

BACKGROUND OF INVENTION

1. Field of the Invention

The present invention relates to a method for automatically tracing an interface for an exchange and a subscriber network using a network management system such as an EMS (Element Management System) in order to perform cause tracking in a more easy and convenient manner when problems are generated upon matching due to characteristics of each subscriber (AN: Access Network) or an exchange (LE: Local Exchange) and a system vendor in all systems having, in their inside, an interface protocol for an exchange and a subscriber network such as a V5.2 protocol.

2. Description of Related Art

Generally, a protocol analyzer must be provided for tracing an interface between LE and AN equipments according to a related art. But, in a related art there has been a problem that trace information in the limited condition could not provide such usefulness and convenience as those obtained by the general protocol analysis equipment. Also, there has been a problem that the information could not be easily used for cause analysis of a problem related to an exchange that could occur upon actual operation under such condition.

SUMMARY OF THE INVENTION

To solve the above-indicated and other problems, it is, therefore, an object of the present invention to provide a method for automatically tracing an interface for an exchange and a subscriber network, wherein setting an operator, reference, a procedure for notifying an event are defined, so that a user could perform interface trace for an exchange and a subscriber network through a network management system such as an EMS.

It is another object to provide a technique and apparatus for automatically tracing an interface for an exchange and a subscriber network that is easy and inexpensive to implement.

It is yet another object to provide for all the systems having, in their inside, an interface protocol for an exchange and a subscriber network such as a V5.2 protocol, could perform and cause tracking upon generation of problems in a more easy and convenient manner when problems are generated upon matching due to characteristics of each AN or an LE and a system vendor.

It is another object to provide a message of an interface protocol such as a V5.2 protocol to an operator so that trace is possibly performed for each user port or protocol entity.

It is yet another object to provide information that should be indispensably provided to an operator according to a designated input/output type, aiming at providing information easily used for cause analysis of problems related to an exchange that could occur upon actual operation.

It is still another object, according to the present invention, to provide a technique so that an operator could trace an interface between an exchange and a subscriber network, such as a V5.2 protocol, using a network management system such as the EMS, so that the operator easily performs tracing and checking.

The foregoing and other objects and advantages are realized by providing a method for tracing a subscriber applied to a communication system, including the steps of: receiving setting particulars from an operator in order to perform tracing of a subscriber with respect to an interface for LE (Local Exchange) and a subscriber network (AN: Access network); checking setting particulars of the operator by receiving trace request for the interface from the operator, performing tracing relevant to the setting particulars, providing tracing results to the operator; and providing information for an event so that the operator could check the information upon occurrence of a trace event at an interface relevant to the setting particulars of the operator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2A and FIG. 2B are drawings showing one embodiment of trace input message in a method for automatically tracing an interface for an exchange and a subscriber network according to the present invention;

DETAILED DESCRIPTION OF EXEMPLARY EMBODIMENTS

Figure 1:
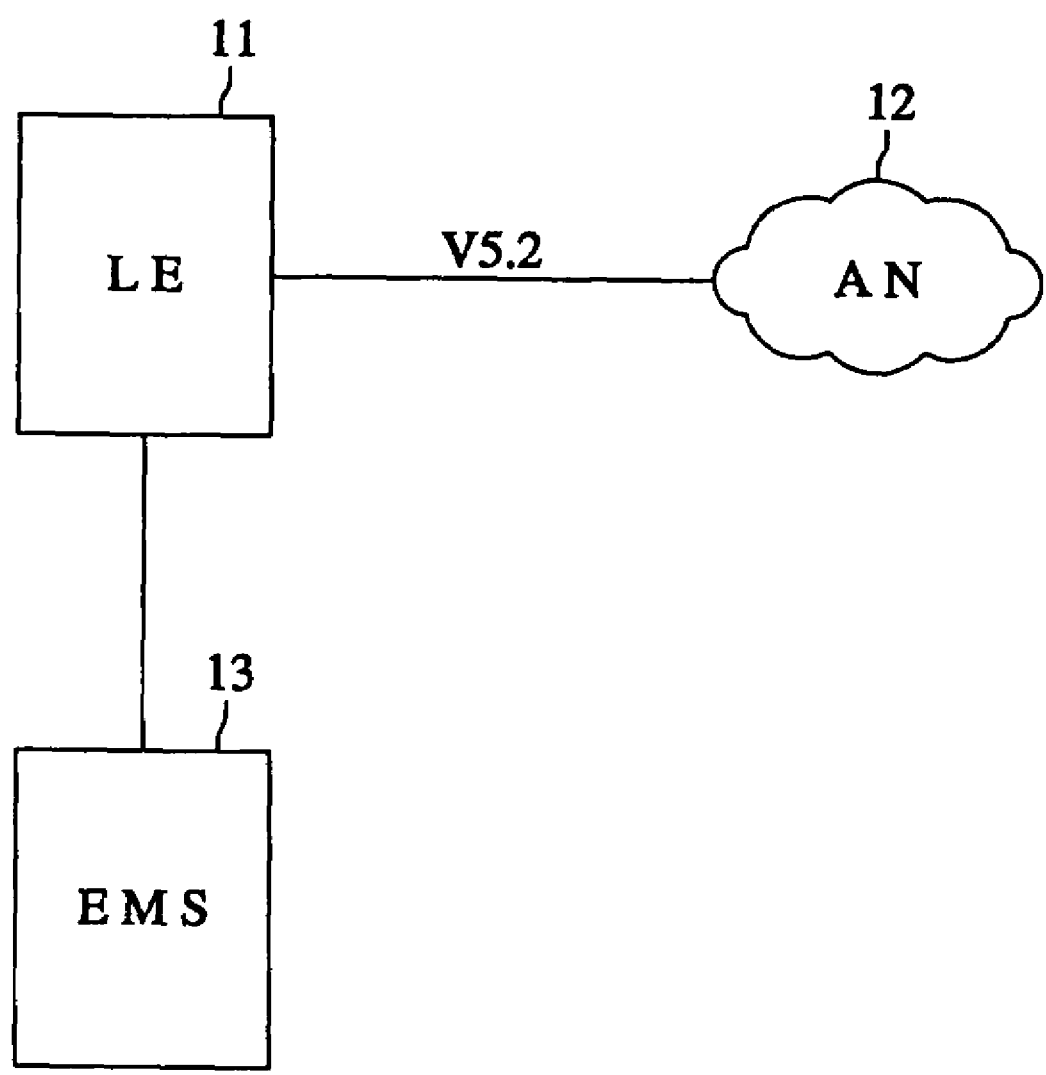
FIG. 1 is an exemplary view of a construction for a communication system to which the present invention is applied.

A preferred embodiment of the present invention will now be described with reference to the accompanying drawings. In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is an exemplary view of a construction for a communication system to which the present invention is applied.

The system to which the present invention is applied, includes an LE (local exchange) 11, an AN (Access Network) 12 and an EMS (Element Management System). In addition, an interface by a V5.2 protocol is formed between the LE 11 and the AN 12.

The present invention will be described with the V5.2 protocol taken as a representative example for an interface for the LE 11 and the AN 12.

In the first place, the V5.2 protocol will be described in the following.

The V5.2 protocol is one of the protocols between the LE and the AN equipment and is an international standard recommended by ITU-T (International Telecommunications Union-Telecommunication Standardization Sector). With use of a circuit collecting function of a subscriber network (AN) equipment connected to a subscriber circuit, use efficiency of a circuit between the AN equipment and the LE is improved, so that a number of installed circuits could be reduced.

Therefore, presuming that one million of telephone subscribers are accommodated, exchange capacity of about one million and four hundred forty thousand circuits is required according to a method of a related art for directly connecting an exchange with a telephone/PC (Personal Computer) using a copper line. On the contrary, Hanaro Telecom Co. uses merely seven hundred thousand circuits for both circuits of a subscriber side for connecting, at the exchange, a subscriber network equipment and circuits of transit trunk for connecting between the exchanges, so that reduction of almost 50% in investment costs could be achieved.

In order to provide a method for automatically tracing a subscriber on a system using the V5.2 protocol, the following requirements should be met.

The V5.2 protocol consists of the following five protocol entities as shown in [Table 1] (for function description of each protocol entity, refer to ETS (European Telecommunication Standard) 300 324-1 and ETS 300 347-1).

TABLE 1

PSTN (Public Switched Telephone Network referred to PSTN-PE hereinafter)
BCC (Bearer Channel Connection referred to BCC-PE hereinafter)
CONTROL (referred to CTRL-PE hereinafter)
LINK CONTROL (referred to LINKC-PE hereinafter)
PROTECTION (referred to PROT-PE hereinafter)

Among the above protocol entities, PSTN-PE, BCC-PE, CTRL-PE are messages for operating in unit of each user port, and LINKC-PE, PROT-PE are messages for operating in unit of V5.x (referred to V5 hereinafter) interface. Therefore, in order for trace information of the V5 protocol message to provide a user and a developer with useful information, the following requirements are indispensable.

1. Message trace for each protocol entity should be possible.
2. PSTN-PE, BCC-PE, CTRL-PE should be possibly traced in unit of user port.
3. LINKC-PE, PROT-PE should be possibly traced in unit of V5 interface.
4. It should be possible to simultaneously operate or release trace for a plurality of entities.
5. In case of analyzing and outputting message information, it should be possible to output even an information element within an optional parameter and information within the information element as well as a mandatory element of each protocol entity.
6. It should be possible to mark direction (AN->LE or LE->AN) on an output message.
7. It should be possible to mark information (name) for a protocol entity on an output message.
8. Function by which an operator could watch trace for an interface on progress, should be provided.
9. The maximum number of possible input is limited up to ten subscribers at a subscriber basis.
10. Output type should be possibly selected from options including a case of outputting message information in terms of hexadecimal and a case of analyzing, at an operator side, message information, and outputting the same.
11. Time information should be included in message trace results. Namely, as the main purpose of message trace is to trace a matching problem between different systems, a response time for a message sent to the counterpart is important.

FIG. 2A and FIG. 2B are drawings showing one embodiment of a trace input message in a method for automatically tracing an interface for an exchange and a subscriber network according to the present invention.

A message appearing in case that an operator inputs "V5ID:=100", is shown in FIG. 2A.

As shown in FIG. 2A, such case shows a subscriber registered at V5ID=100. As the above condition requires accommodation of ten subscribers at the maximum, ten subscribers are accommodated. But, such accommodation quantity may be changed depending on the given condition.

A message appearing in case that an operator does not input "V5ID", is shown in FIG. 2B.

As shown in FIG. 2B, display is performed for all the registered V5 interface IDs (Identification) on the first place, and then display is performed for all the registered subscribers. As described above, display is performed up to ten subscribers at the maximum.

A trace output message in a method for automatically tracing an interface for an exchange and a subscriber network according to the present invention, will be described with reference to [Table 2] through [Table 6].

A menu bar of an output type is the same for all protocols. But, values are set, respectively, for fields used for each protocol.

[Table 2] shows a case whose type is 'PSTN' as follows.

TABLE 2

| Time | Direction | V5ID | Protocol | L3Addr | Message | Signal |
|---|---|---|---|---|---|---|
| 1:18:19:24 | AN->LE | 100 | PSTN | 19 | ESTABLISH | OFF HOOK |

In the above [Table 2], 'Time', 'Direction', 'V5ID', 'Protocol', 'L3 Address' are parameters commonly applied to all the protocols of 'PSTN', 'BCC', 'CONTROL', 'PROTECTION', 'LINK CONTROL' which are five protocol entities for the V5.2 protocol. Those parameters are also all used for the other four cases as well as the case whose type is 'PSTN'.

But, 'Message', 'Signal' shown on the right of above [Table 2] are information elements for the PSTN protocol.

[Table 3] shows a case whose type is 'BCC' as follows.

TABLE 3

| Time | Direction | V5ID | Protocol | L3Addr | Message | PORTID | LINKID | TSID | Variant |
|---|---|---|---|---|---|---|---|---|---|
| 1:18:19:24 | AN->LE | 100 | BCC | 19 | Allocation | 281 | 1 | 4 | — |

'Message', 'PORTID', 'LINKID', 'TSID', 'Variant' shown on the right of above [Table 3], are information elements for the BCC protocol.

[Table 4] shows a case whose type is 'LINK CONTROL' as follows.

TABLE 4

| Time | Direction | V5ID | Protocol | L3Addr | Message | FUNCTION ID |
|---|---|---|---|---|---|---|
| 1:18:19:24 | AN->LE | 100 | LINKCTRL | 0 | Allocation | FE301/FE302 |
| ... | | | | | | |

'Message', 'FUNCTION ID' shown on the right of above [Table 4], are information elements for the LINK CONTROL protocol.

[Table 5] shows a case whose type is 'PROTECTION' as follows.

TABLE 5

| Time | Direction | V5ID | Protocol | L3Addr | Message | LINKID | TSID | Sequence Number |
|---|---|---|---|---|---|---|---|---|
| 1:18:19:24 | AN->LE | 100 | PROTECTION | 19 | SwitchOver COM | 0 | 16 | 3 |
| ... | | | | | | | | |

'Message', 'LINKID', 'TSID', 'Sequence Number' shown on the right of above [Table 5], are information elements for the PROTECTION protocol.

[Table 6] shows a case whose type is 'CONTROL' as follows.

TABLE 6

| Time | Direction | V5ID | Protocol | L3Addr | Message | FUNCTIONID |
|---|---|---|---|---|---|---|
| 1:18:19:24 | AN->LE | 100 | CONTROL | 50 | PortControl | FE201/FE202 |
| ... | | | | | | |

'Message', 'FUNCTION ID' shown on the right of above [Table 6], are information elements for the CONTROL protocol.

FIG. 3A through FIG. 3E are drawings showing one embodiment of a trace by a user in a method for automatically tracing an interface for an exchange and a subscriber network according to the present invention.

Figure 3A:
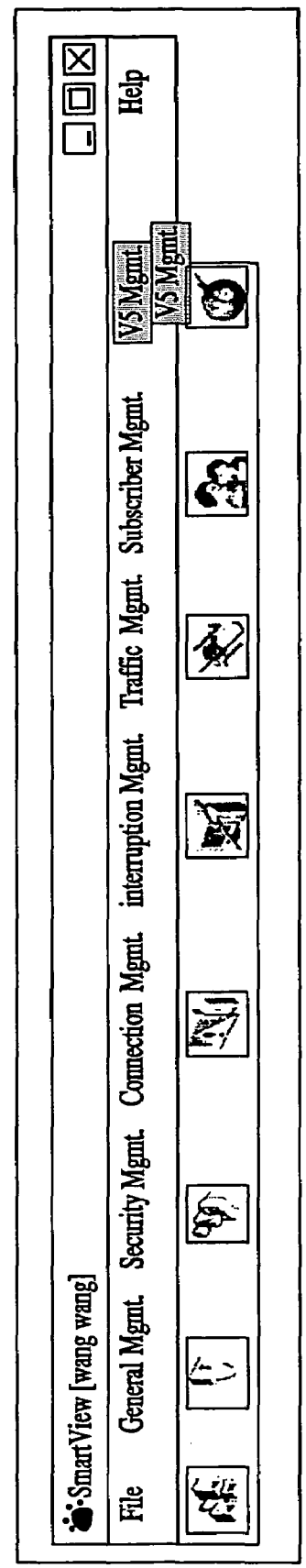
FIG. 3A through FIG. 3E are drawings showing one embodiment of tracing by a user in a method for automatically tracing an interface for an exchange and a subscriber network according to the present invention.

In the first place, an operator operates a method for automatically tracing a subscriber according to the present invention, by clicking <V5 management> in a main menu for providing menus such as 'File', 'General management', 'Security management', 'Connection management', 'Interruption management', 'Performance management', 'Traffic management', 'Subscriber management', 'V5 management', 'Cooperation management', 'Power management', 'RDL management', 'Facility status', 'DB (Database) management' and 'Help' as shown in FIG. 3A.

Figure 3B:
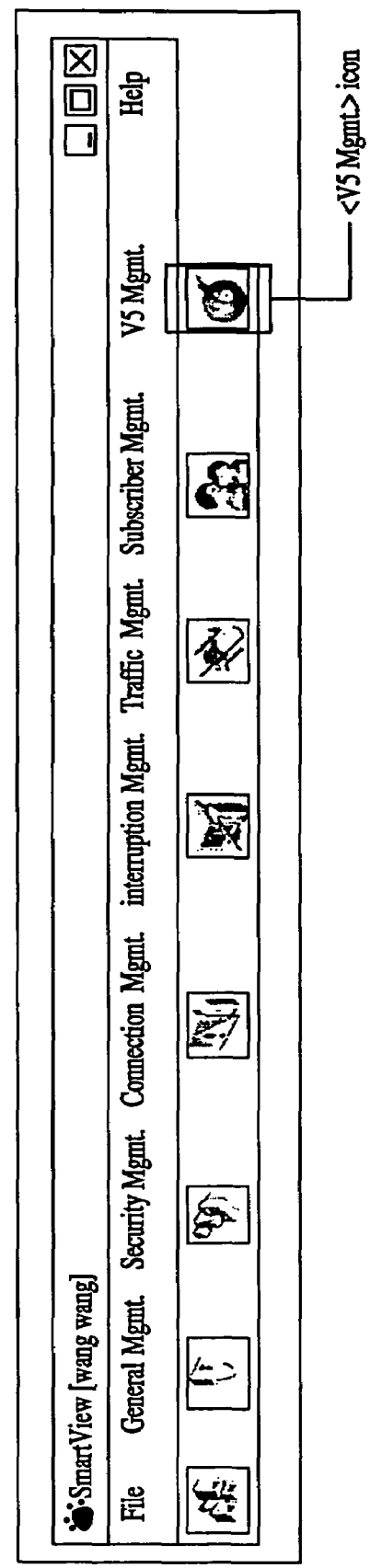

FIG. 3B shows that an operator operates a method for automatically tracing a subscriber according to the present invention by clicking a <V5 management> icon on a tool bar.

Figure 3C:
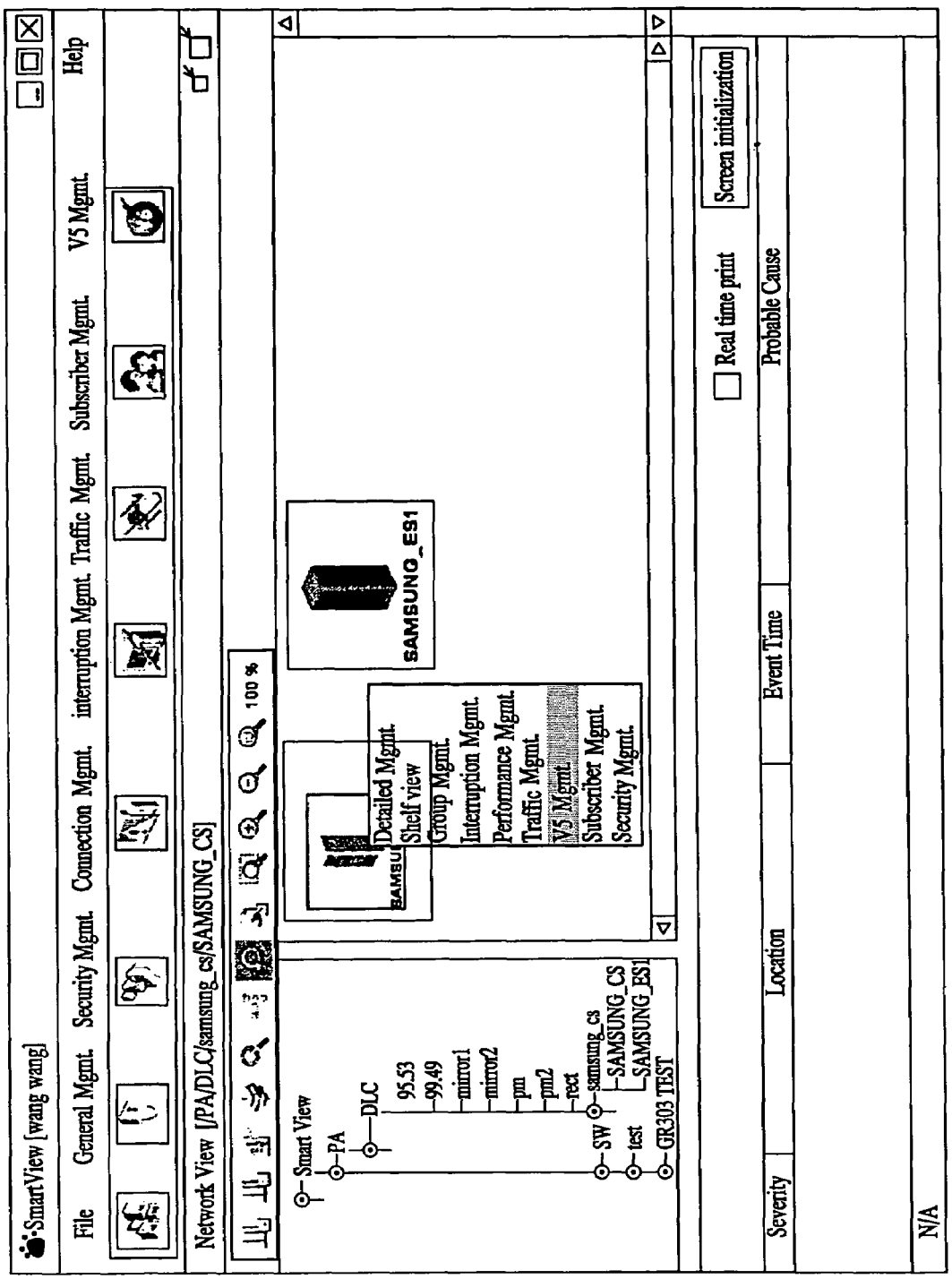

FIG. 3C shows that an operator operates a method for automatically tracing a subscriber according to the present invention using a pop-up menu.

As shown in the drawings, an operator operates a method for automatically tracing a subscriber according to the present invention by selecting <V5 management> using a pop-up menu by pressing the right button of a mouse after selecting the relevant shelf icon in a network view.

Namely, in above FIG. 3A through FIG. 3C, a method for automatically tracing a subscriber according to the present invention is operated by an operator and as described above, an operator could operate the method using the main menu, the tool bar, or the pop-up menu.

Figure 3D:
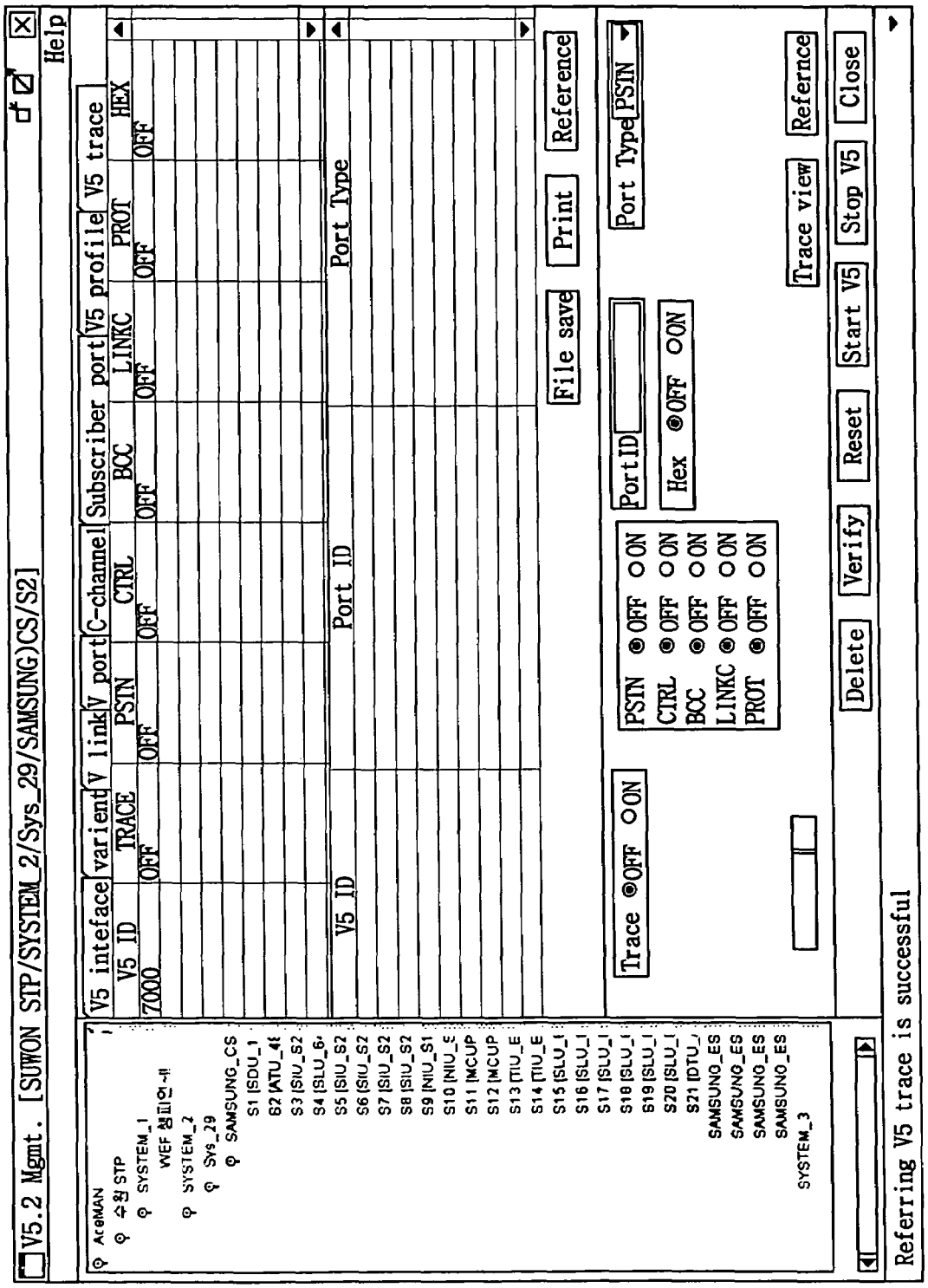

If a <V5 management> screen is operated through the procedures of FIG. 3A through FIG. 3C and V5 trace tap is pressed, a <V5 management>screen is displayed as shown in FIG. 3D.

EMS should use a protocol analyzer in order to trace an interface between equipments when interfacing AN (or LE).

For convenience of an operator, V5 trace could analyze a protocol message without using the analyzer.

Descriptions of parameters used for the V5 trace tap are given by [Table 7] as follows.

TABLE 7

| Parameter | Description |
|---|---|
| V5 ID | Standing for a V5 interface ID. |
| PSTN | Determining whether to display a message from PSTN. |
| TRACE | Determining whether to perform message tracing. ON: Performing tracing. OFF: Not performing tracing. |
| BCC | Determining whether to display a BCC message. |
| CTRL | Determining whether to display a CTRL (Control) message. |
| PROT | Determining whether to perform switching upon occurrence of interruption at a link. |
| LINKC | Determining whether to perform LINKC (Link control). |
| Port ID | Determining a port ID of a subscriber. |
| HEX | Determining whether to add a Hex value to the back of a message.ON: Outputting a Hex value to the back of a message additionally.OFF: Outputting a message only. |
| Port Type | Determining a port kind of a subscriber. It is divided into PSTN, ISDN-BRI, ISDN-PRN. |

Setting and deleting trace for V5ID will be described in the following. Procedures for setting/deleting trace for V5ID are as follows.

1. Setting V5 trace: Input a value in a V5 ID on a setting screen, selecting 'ON' for trace, selecting 'ON' for items to set (PSTN, CTRL, BCC, LINKC, PROT), then pressing a [set] button.

2. Releasing V5 trace: Input a value in a V5 ID on a setting screen, selecting 'OFF' for trace, selecting 'ON' for items to set (PSTN, CTRL, BCC, LINKC, PROT), then pressing a [set] button.

Setting and deleting a specific port will be described in the following. Procedures for setting/deleting a specific port are as follows.

1. Setting a port: Input a value in a port ID on a setting screen, selecting 'ON' for trace, pressing a [set] button.

2. Deleting a port: Input a value in a port ID on a setting screen, selecting 'OFF' for trace, pressing a [set] button.

Figure 3E:
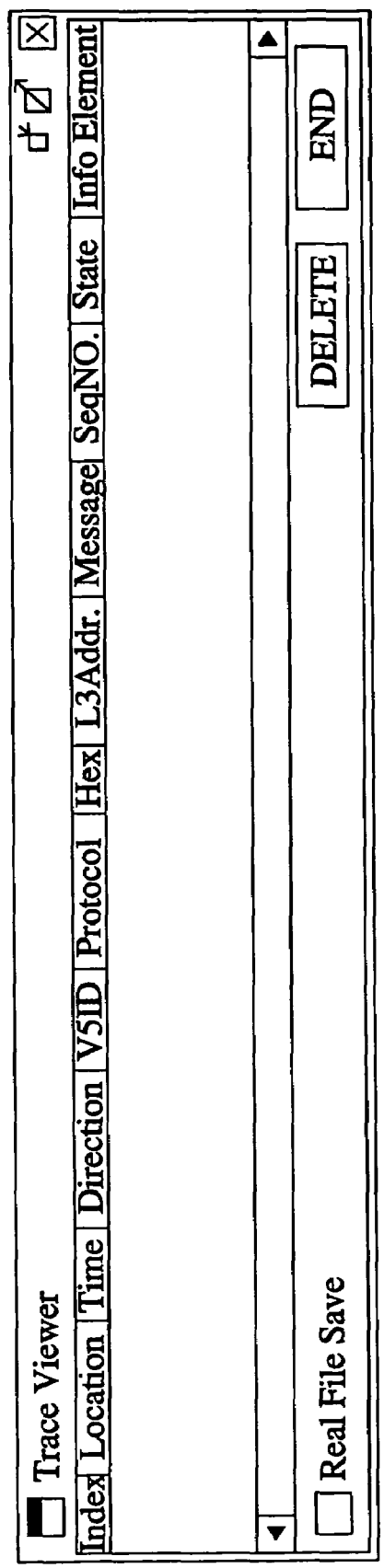

Viewing of the trace will be described with reference to a trace viewer shown in FIG. 3E.

If a [trace view] button positioned on a lower table is clicked at the status that trace is set to 'ON', the below screen is displayed. If trace notification occurs, data is output on a screen shown in FIG. 3E in case of the relevant shelf.

Figure 4A:
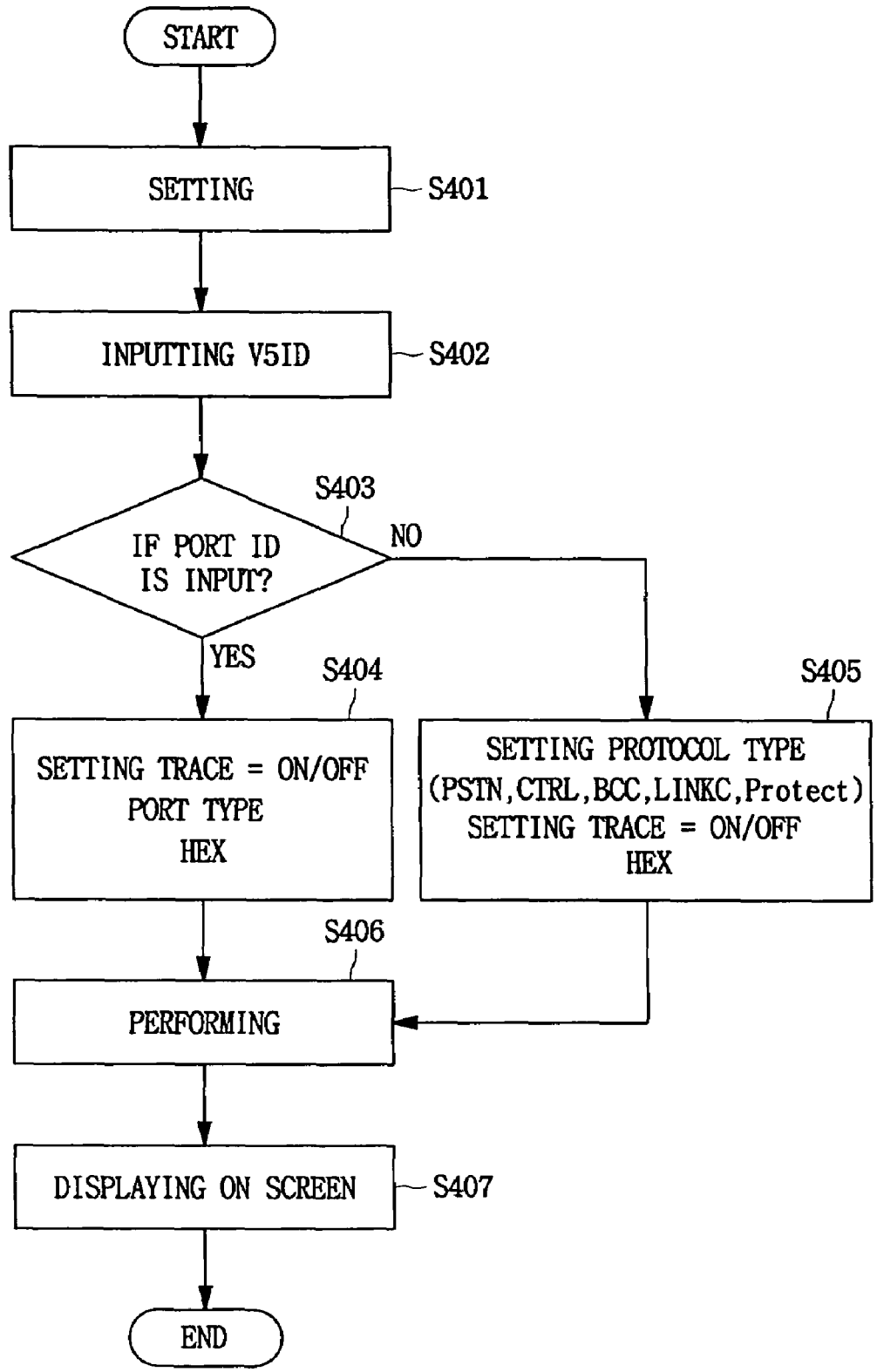
FIG. 4A and FIG. 4B are flowcharts of one embodiment for setting and referring in a method for automatically tracing an interface for an exchange and a subscriber network according to the present invention.
Figure 4B:
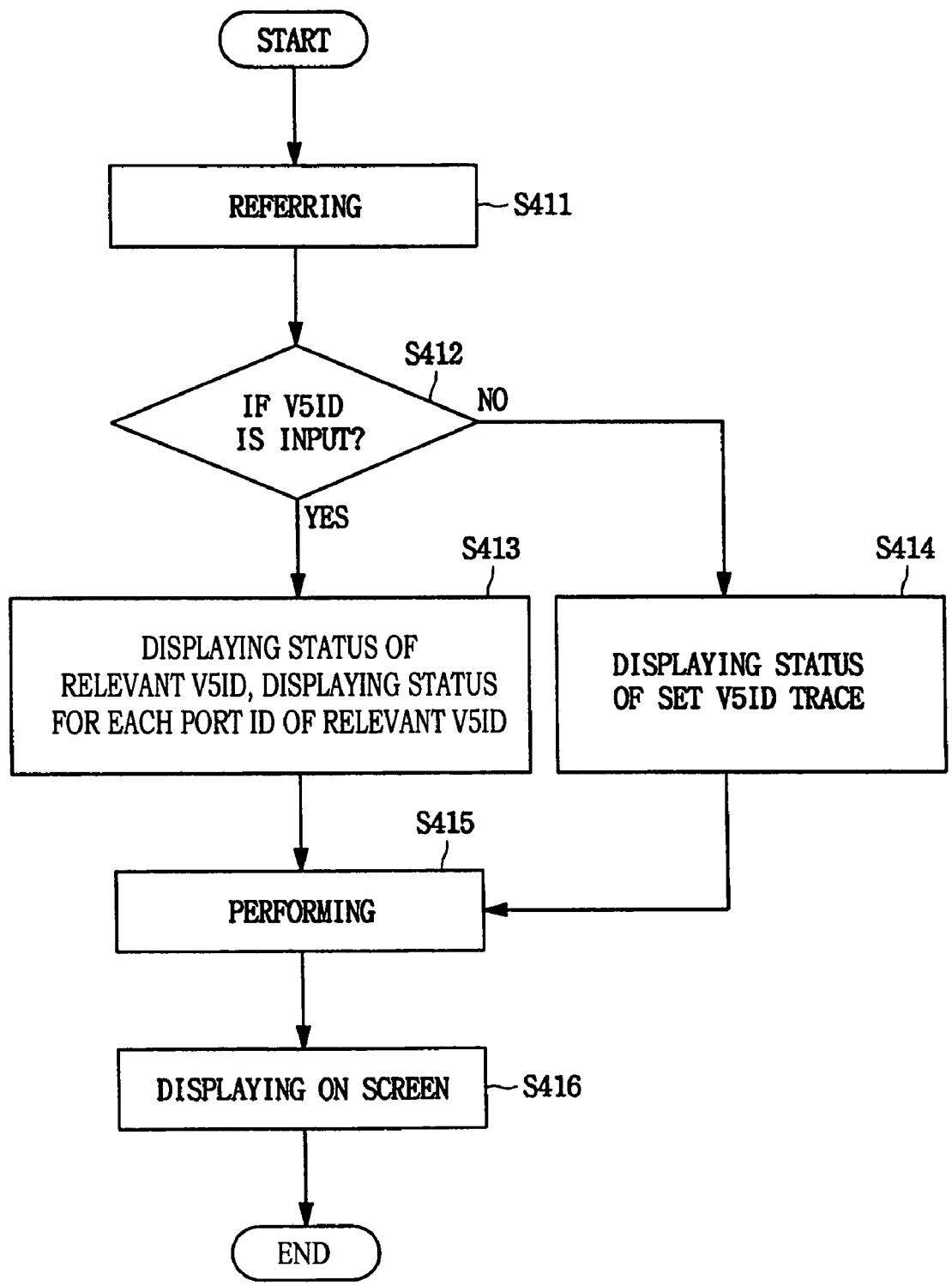

FIG. 4A and FIG. 4B are flowcharts of one embodiment for setting and referring in a method for automatically tracing an interface for an exchange and a subscriber network according to the present invention.

A method for automatically tracing an interface for an exchange and a subscriber network according to the present invention automatically performs tracing, providing results thereof according to a request from an operator under circumstances where an interface between LE and AN, i.e., an interface such as a V5.2 protocol is used. More specifically, as described above, relevant trace information is referred and results are provided according to a request from an operator on the basis of a detailed protocol type such as 'PSTN', 'BCC', 'CTRL', 'LINKC', 'PROT' and an identifier of a V5 ID, a port ID.

As the present invention having the foregoing construction is realized through a network management system such as an EMS, one embodiment of the present invention will be described with the EMS taken as an application object through which the present invention is realized.

In the present invention FIG. 4A shows a setting procedure by an operator, and FIG. 4B shows a process procedure according to a referring request from an operator.

On the first place, the setting procedure will be described with reference to a flowchart of FIG. 4A in the following.

The EMS receives a setting request for a method for tracing a subscriber of the present invention, from an operator (S401), requesting an operator to input a V5 ID.

The requested V5 ID is input from an operator (S402), and then whether a port ID is input, is checked (S403).

As a result of checking, if a port ID is input, the EMS receives setting for the relevant particulars from an operator by getting an operator to set the trace to 'ON' or 'OFF', to set a corresponding port type, and to set whether to describe a 'HEX' value (S404).

If a port ID is not input as a result of checking whether a port ID is input after receiving the requested V5 ID from an operator, the EMS receives setting for the relevant particulars from an operator by getting an operator to set a detailed protocol type such as 'PSTN', 'BCC', 'CTRL','LINKC', 'PROT', to set 'ON' or 'OFF' for a basic trace, and to set whether to describe a 'HEX' value (S405).

The EMS to which the present invention is applied, stores the relevant setting particulars for information received from an operator in this manner, performing the setting on a system on the basis of such information (S406). Also, the EMS displays and provides the information on a screen, so that an operator could check (S407).

A process procedure according to a referring request from an operator as shown in FIG. 4B will be described in the following.

In the first place, the EMS receives a referring request from an operator (S411). Then, the IEMS checks whether a V5 ID is input (S412). If a V5 ID is input as a result of checking, the EMS displays a status of the relevant V5 ID, displaying a status for each port ID of the relevant V5 ID (S413). As suggested in FIG. 2A, such procedure corresponds to input information display according to a referring request from an operator.

If a V5 ID is not input as a result of checking whether a V5 ID is input, the EMS displays a status of the set V5 ID trace on a screen (S414). As suggested in FIG. 2B, such procedure corresponds to input information display according to a referring request from an operator.

The EMS which has performed input information display according to a referring request from an operator, performs trace on the basis of the above input information (S415), displaying results thereof on the screen (S416).

Figure 5:
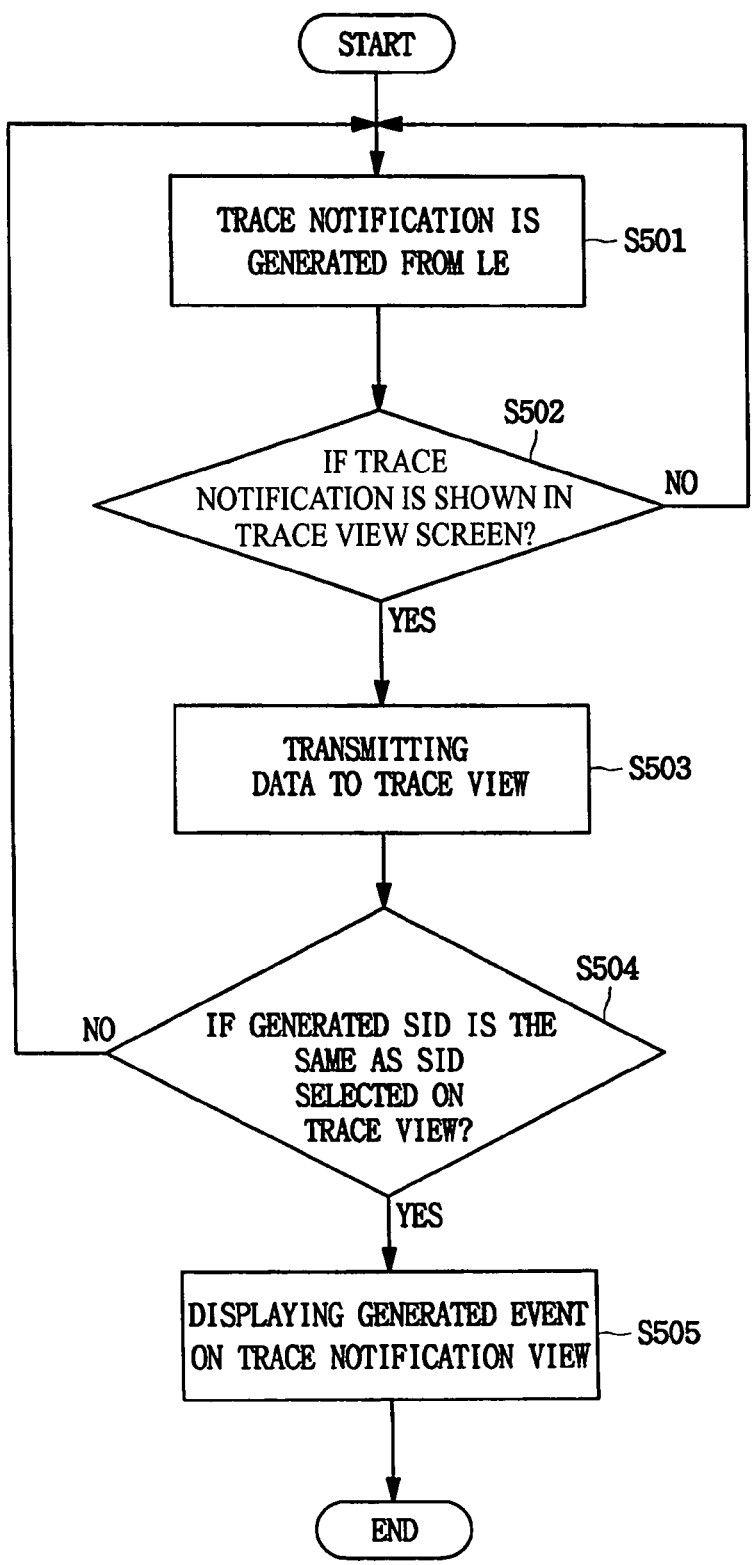
FIG. 5 is a flowchart showing one embodiment of an event processing in a method for automatically tracing an interface for an exchange and a subscriber network according to the present invention.

FIG. 5 is a flowchart showing one embodiment of an event processing in a method for automatically tracing an interface for an exchange and a subscriber network according to the present invention.

With reference to FIG. 4A and FIG. 4B, a method for automatically tracing a subscriber in response to a request from an operator in a method for automatically tracing an interface for an exchange and a subscriber network according to the present invention, has been described, but FIG. 5 is for providing information for event occurrence to an operator. For such event, there exist a notification as described above and a trap.

The trap will be briefly described in the following.

The trap is an interrupt automatically occurring whenever one command is executed. Such interrupt is generated in a manner of hardware by the central processing unit, in which whenever one command is executed in a program, control of execution is automatically taken over to a trap process routine defined in advance. Therefore, operation status of a program is possibly traced by a unit of one command, so that the trap is used for finding fallacy in a system software that is closely related to a hardware device rather than for debugging in a general application software.

The foregoing process according to event occurrence will be described with reference to a flowchart of the drawing in the following.

In the first place, the EMS receives information of trace notification occurrence from LE (S501). Of course, in case of trap occurrence described above, the same procedure is applied. Also, although delivery of notification from LE only is described through FIG. 5, delivery of notification from AN may be possible. It depends on realization of communication system to which the present invention is applied.

If notification condition occurs in this manner, the EMS checks whether the notification is an event represented through a trace view screen in order to show an operator such condition (S502). If the notification is not an event that should be represented through a trace view screen as a result of checking, the EMS stands by, repeating from the above step S501 of event occurrence.

If the generated event is an event that should be represented through a trace view screen as a result of checking whether the generated event is an event represented through a trace view screen, the EMS transmits relevant data to a trace view processing block (S503).

The trace view processing block checks whether a system ID (SID) for the generated event is the same as the system ID (SID) selected on a trace view (S504). If a system ID is not the same as a result of checking, the trace view processing block stands by, repeating from the above step S501 of event occurrence, for the trace view processing block does not need to provide the event through a trace view screen.

If a system ID is the same as a result of checking whether a system ID (SID) for the occurred event is the same as the system ID (SID) selected on a trace view, then the trace view processing block displays the generated event on the trace notification view (S505).

Namely, according to the present invention, upon occurrence of an event, whether the relevant event is within a set range of being displayed on the screen, is checked, so that an event occurring within the set relevant range could be displayed on the screen.

As is apparent from the foregoing, a method for automatically tracing a subscriber according to the present invention is realized through a network management system such as the EMS (Element Management System), and a user could set, refer and perform event checking using the EMS.

The method of the present invention in the foregoing, could be realized in form of a program and stored at recording media such as CD-ROM (Compact Disc-Read Only Memory), RAM (Random Access Memory), ROM (Read-Only Memory), a floppy disk, a hard disk, an optical magnetic disk, etc., in a form that could be read by a computer.

According to the present invention, all the systems having, in their inside, an interface protocol for an exchange and a subscriber network such as a V5.2 protocol, could perform cause tracking upon generation of problems in a more easy and convenient manner when problems are generated upon matching due to characteristics of each AN or an LE and a system vendor.

Also, according to the present invention, a message of an interface protocol such as a V5.2 protocol is provided to an operator so that trace is possibly performed for each user port or protocol entity.

Also, trace information under limited circumstance could not have the same usefulness and convenience as the case of the general protocol analyzing equipment but, under such circumstance, the present invention has a strong point of being able to provide information that should be indispensably provided to an operator according to a designated input/output type, aiming at providing information easily used for cause analysis of problems related to an exchange that could occur upon actual operation.

Also, according to the present invention, an operator could trace an interface between an exchange and a subscriber network, such as a V5.2 protocol, using a network management system such as the EMS, so that an operator easily performs tracing and checking.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for automatically tracing an interface for an exchange and a subscriber network comprising the steps of:

receiving setting particulars from an operator in order to perform a trace of a subscriber with respect to an interface for a local exchange and a subscriber network;

checking the setting particulars of the operator by receiving a trace request for the interface from the operator, performing trace relevant to the setting particulars, providing trace results to the operator; and providing information for an event accommodating the operator to check the information upon occurrence of a trace event at an interface relevant to the setting particulars of the operator, wherein the setting particular includes determining whether to add the first value to the back of a message when a port identification is not input as a result of checking whether a port identification is input after receiving the requested identification.

2. The method according to claim 1, wherein trace for the interface and trace information providing are realized through a network management system used by the operator.

3. The method according to claim 2, wherein the network management system is substantially an element management system.

4. The method according to claim 3, wherein the step of receiving the setting particulars from the operator comprises the steps of:

providing a setting menu to the operator, receiving inputs thereto in order to perform a subscriber trace with respect to an interface for an exchange and a subscriber network;

storing an identification for the interface from the operator; and storing setting information input from the operator in order to perform trace for a user port or each protocol entity depending on whether a port identifier is input from the operator.

5. The method according to claim 2, wherein the step of receiving the setting particulars from the operator comprises the steps of:

providing a setting menu to the operator, receiving inputs thereto in order to perform a subscriber trace with respect to an interface for an exchange and a subscriber network;

storing an identification for the interface from the operator; and storing setting information input from the operator in order to perform trace for a user port or each protocol entity depending on whether a port identifier is input from the operator.

6. The method according to claim 1, wherein the step of receiving the setting particulars from the operator comprises the steps of:

providing a setting menu to the operator, receiving inputs thereto in order to perform a subscriber trace with respect to an interface for an exchange and a subscriber network;

storing an identification for the interface from the operator; and storing setting information input from the operator in order to perform trace for a user port or each protocol entity depending on whether a port identifier is input from the operator.

7. The method according to claim 3, wherein the step of checking the setting particulars of the operator comprises the steps of:

receiving a request from the operator in order to perform a subscriber trace with respect to an interface for an exchange and a subscriber network including a V5 protocol;

checking whether information for the designated interface as well as the trace request from the operator exist;

when information for the designated interface exists as a result of checking, requesting performing of trace for the interface on the basis of the information, receiving the performed trace results, displaying the results in order to provide the same to the operator; and when information for the designated interface does not exist as a result of checking, grasping the setting particulars from the operator, requesting performing of trace for the interface on the basis of the setting particulars, receiving the performed trace results, displaying the same.

8. The method according to claim 2, wherein the step of checking the setting particulars of the operator comprises the steps of:

receiving a request from the operator in order to perform a subscriber trace with respect to an interface for an exchange and a subscriber network, including a V5 protocol;

checking whether information for the designated interface as well as the trace request from the operator exist;

when information for the designated interface exists as a result of checking, requesting performing of trace for the interface on the basis of the information, receiving the performed trace results, displaying the results in order to provide the same to the operator; and when information for the designated interface does not exist as a result of checking, grasping the setting particulars from the operator, requesting performing of trace for the interface on the basis of the setting particulars, receiving the performed trace results, displaying the same.

9. The method according to claim 1, wherein the step of checking the setting particulars of the operator comprises the steps of:

receiving a request from the operator in order to perform a subscriber trace with respect to an interface for an exchange and a subscriber network, including a V5 protocol;

checking whether information for the designated interface as well as the trace request from the operator exist;

when information for the designated interface exists as a result of checking, requesting performing of trace for the interface on the basis of the information, receiving the performed trace results, displaying the results in order to provide the same to the operator; and when information for the designated interface does not exist as a result of checking, grasping the setting particulars from the operator, requesting performing of trace for the interface on the basis of the setting particulars, receiving the performed trace results, displaying the same.

10. The method according to claim 3, wherein the step of providing the information for the event comprises the steps of:

being informed of occurrence of the event related to an interface for an exchange and a subscriber network, including a V5 protocol;

checking whether the event is an event of a level that should be informed to the operator, and when the event is checked to be an event of a level that should be informed to the operator, checking whether setting from the operator exists;

when setting from the operator does not exist with respect to the event as a result of checking, standing by without informing the operator of the event; and when setting from the operator exists with respect to the event as a result of checking, displaying information for the event accommodating the operator to check.

11. The method according to claim 2, wherein the step of providing the information for the event comprises the steps of:

being informed of occurrence of the event related to an interface for an exchange and a subscriber network, including a V5 protocol;

checking whether the event is an event of a level that should be informed to the operator, and when the event is checked to be an event of a level that should be informed to the operator, checking whether setting from the operator exists;

when setting from the operator does not exist with respect to the event as a result of checking, standing by without informing the operator of the event; and when setting from the operator exists with respect to the event as a result of checking, displaying information for the event accommodating the operator to check.

12. The method according to claim 1, wherein the step of providing the information for the event comprises the steps of:

being informed of occurrence of the event related to an interface for an exchange and a subscriber network, such as a V5 protocol;

checking whether the event is an event of a level that should be informed to the operator, and when the event is checked to be an event of a level that should be informed to the operator, checking whether setting from the operator exists;

when setting from the operator does not exist with respect to the event as a result of checking, standing by without informing the operator of the event; and when setting from the operator exists with respect to the event as a result of checking, displaying information for the event accommodating the operator to check.

13. The method according to claim 12, further comprised of the exchange being a local exchange.

14. The method according to claim 13, further comprised of the subscriber network being an access network.

15. A method, comprising of:

receiving a setting request accommodating tracing of a subscriber requesting to input an identification;

inputting the requested identification and then checking whether a port identification is input;

setting the trace to on or off, setting a corresponding port type, and to set whether to describe a first value when the port identification is input as a result of checking, determining whether to add the first value to the back of a message;

when a port identification is not input as a result of checking whether a port identification is input after receiving the requested identification, receiving setting for the relevant particulars by setting a detailed protocol type;

storing the relevant setting particulars for information received, performing the setting on a system on the basis of such information; and displaying and providing the information on a screen, accommodating a check of the information.

16. The method of claim 15, further comprising of:
receiving a referring request;
checking whether the identification is input;
when the identification is input as a result of checking, displaying a status of the relevant identification, displaying a status for each port identification of the relevant identification;
when the identification is not input as a result of checking whether identification is input, displaying a status of the set identification trace on a screen, performing input information display according to the referring request; and
performing a trace on the basis of the input information and displaying results thereof on the screen.

17. The method of claim 15, with the identification being a V5 identification.

18. The method of claim 15, further comprising of:
receiving information of trace notification occurrence;
when notification condition occurs, checking whether the notification is an event represented through a trace view screen in order to show such condition;
when the generated event is an event that should be represented through a trace view screen as a result of checking whether the generated event is an event represented through a trace view screen, transmitting relevant data to a trace view processing block;
checking whether a system identification for the generated event is the same as the system identification selected on a trace view by the trace view processing block; and
when a system identification is the same as a result of checking whether a system identification for the occurred event is the same as the system identification selected on a trace view, then displaying the generated event on the trace notification view by the trace view processing block.

19. A computer-readable medium having computer-executable instructions for performing a method, comprising:
receiving setting particulars from an operator in order to perform a trace of a subscriber with respect to an interface for a local exchange and a subscriber network;
checking the setting particulars of the operator by receiving a trace request for the interface from the operator, performing trace relevant to the setting particulars, providing trace results to the operator; and
providing information for an event accommodating the operator to check the information upon occurrence of a trace event at an interface relevant to the setting particulars of the operator,
wherein the setting particular includes determining whether to add the first value to the back of a message when a port identification is not input as a result of checking whether a port identification is input after receiving the requested identification.

20. A computer-readable medium having stored thereon a data structure usable by a computer program to control the operation of a computer, comprising:
a first field containing data representing receiving a setting request accommodating tracing of a subscriber requesting to input an identification;
a second field containing data representing inputting the requested identification and then checking whether a port identification is input;
a third field containing data representing setting the trace to on or off, setting a corresponding port type, and to set whether to describe a first value when the port identification is input as a result of checking, determining whether to add the first value to the back of a message;
a fourth field containing data representing when a port identification is not input as a result of checking whether a port identification is input after receiving the requested identification, receiving setting for the relevant particulars by setting a detailed protocol type;
a fifth field containing data representing storing the relevant setting particulars for information received, performing the setting on a system on the basis of such information; and
a sixth field containing data representing displaying and providing the information on a screen, accommodating a check of the information.

* * * * *